(12) United States Patent
Lenive

(10) Patent No.: US 12,015,210 B2
(45) Date of Patent: Jun. 18, 2024

(54) PHASED ANTENNA ARRAY DEVICE

(71) Applicant: TTP PLC, Royston (GB)

(72) Inventor: Vlad Lenive, Sawston (GB)

(73) Assignee: TTP Plc, Royston (GB)

( * ) Notice: Subject to any disclaimer, the term of this patent is extended or adjusted under 35 U.S.C. 154(b) by 881 days.

(21) Appl. No.: 16/979,805

(22) PCT Filed: Mar. 12, 2019

(86) PCT No.: PCT/GB2019/050674
§ 371 (c)(1),
(2) Date: Sep. 10, 2020

(87) PCT Pub. No.: WO2019/175558
PCT Pub. Date: Sep. 19, 2019

(65) Prior Publication Data
US 2021/0057817 A1    Feb. 25, 2021

(30) Foreign Application Priority Data
Mar. 12, 2018  (GB) ...................................... 1803922

(51) Int. Cl.
*H04L 12/28*  (2006.01)
*H01Q 1/52*  (2006.01)
(Continued)

(52) U.S. Cl.
CPC .............. *H01Q 3/42* (2013.01); *H01Q 1/523* (2013.01); *H01Q 5/50* (2015.01); *H04B 1/0064* (2013.01)

(58) Field of Classification Search
CPC ........ H04Q 5/50; H04Q 1/523; H04B 1/0064; H04L 12/28
(Continued)

(56) References Cited

U.S. PATENT DOCUMENTS

| 3,922,680 | A  |   | 11/1975 | Alsberg et al. |
| 7,030,824 | B1 |   | 4/2006  | Taft et al. |
| 2022/0255223 | A1 | * | 8/2022 | Tran ...................... H04L 67/535 |

FOREIGN PATENT DOCUMENTS

| DE | 4102410 A1 | 7/1992 |
| JP | 57138202 A | 8/1982 |

OTHER PUBLICATIONS

DE4102410 ( translation) , pp. 1-2, Jul. 30, 1992.*
PCT/GB2019/050674 International Search Report and Written Opinion dated Jun. 19, 2019.

* cited by examiner

*Primary Examiner* — Dang T Ton
(74) *Attorney, Agent, or Firm* — Erise IP, P.A.

(57) ABSTRACT

A phased antenna array device comprises at least one input port for interfacing receive and transmit RF signals to/from an antenna array. A feeding line is provided to carry RF signals of two orthogonal polarizations from the input port $P_1$, and at least one antenna feed element with an aperture or cross section having an order of symmetry C4 and supporting RF signals of two orthogonal polarizations is provided. At least one first substrate contains a plurality of antenna elements integrated into the substrate, with each antenna element capable of operating at two orthogonal polarizations. A plurality of phase shifters are connected to corresponding antenna elements, each phase shifter operating at two orthogonal polarizations, the output port of each phase shifter being connected to a short circuit.

15 Claims, 12 Drawing Sheets

(51) Int. Cl.
*H01Q 3/42* (2006.01)
*H01Q 5/50* (2015.01)
*H04B 1/00* (2006.01)

(58) Field of Classification Search
USPC .................................. 370/329, 400, 401, 403
See application file for complete search history.

PHASED ANTENNA ARRAY DEVICE

RELATED APPLICATION

The present application is a national stage application under 35 U.S.C. § 371 of International Application No. PCT/GB2019/050674, filed 12 Mar. 2019, which claims priority to Great Britain Patent Application No. 1803922.2, filed 12 Mar. 2018. The above referenced applications are hereby incorporated by reference into the present application in their entirety.

FIELD OF THE INVENTION

The present invention relates to a low-loss phased antenna array device and fabrication method for such a device. In particular it relates to a reflectarray antenna in which one or more components of the phased antenna array can be manufactured preferably on a single or several full reticle wafers, by employing a reconstituted wafer process or an embedded wafer level package process.

BACKGROUND OF THE INVENTION

Phased antenna arrays are one of the key concepts in RF engineering, and are used, for instance, for electronic beam-steering, sophisticated beam-forming techniques, and RF processing before a receiver and/or after a transmitter. However, current phased antenna array devices all suffer from complexity in assembly and costly manufacturing.

So far, the most developed technology for fabricating a phased antenna array device is a modular design approach. The modular approach allows for substantial cost reductions and provides controlled assembly techniques. The main idea of the modular approach is to split the device into multiple identical modules, which can be produced in larger quantities, and can then be respectively assembled together.

Losses in Phased Antenna Arrays

The traditional architecture of a phased antenna array module with analog beamforming is very lossy. There are two predominant causes of loss. One cause of loss may be attributed to the corporate divider/combiner which is a specialized circuit used to distribute/collect RF energy to/from the antenna elements. The other cause of loss arises from inherent physical limitations of the silicon components used in the array transmit and receive chain.

Technological development of integrated circuit (IC) manufacturing has opened the way for integrating phased antenna arrays in silicon devices. This approach works well only to some extent because of inherent physical limitations.

The first physical limitation is that the size of a silicon die is typically restricted to a few square millimetres only, because for larger silicon dies, cost per die becomes prohibitive. There are also physical limitations to the size of the die, due to thermal expansion mismatches and resulting cracks in Silicon, and other associated mechanical issues attributed to excessive size of the die. However, the physical distance needed between individual elements of a phased antenna array is linked to the wavelength which is to be transmitted and received by the array. Typically, this distance is about half the used wavelength or possibly 5-20% less than that, depending on the scanning sector specification, i.e. there is also additional dependence on the scanning range. This means that for traditional RF and microwave bands in the frequency range 1-20 GHz, it is not practical to integrate multiple dies on a single silicon substrate, since the ratio of die-size to die-spacing is too small to be cost effective.

The second physical limitation lies in the physical properties of silicon at high frequencies, at which excessive RF losses are the limiting factor to the noise figure of receiver, and to the dissipated power and efficiency of the transmitter. In summary, the above-described silicon-integrated phased antenna array devices have only limited practical applications, particularly at 20-90 GHz frequency range where a wavelength of only some mm is used.

In recent years, advances in IC packaging techniques became another technology vehicle for economically manufacturing phased antenna array devices. This approach uses one or more silicon dies that are integrated into a polymer-based package. Reliable connections between pads on silicon dies and layout realized in layers of the package are possible. For example, reliable connections can be achieved by using BGA soldering.

The above-described conventional approaches, however, suffer from a number of problems. In particular, the approaches based on IC technologies all face the unresolvable contradiction between array size and IC package dimensions. Further also standard IC package sizes are in contradiction with array size limitations set by the low GHz frequency range. Moreover, it is still technologically problematic, and rather costly, to have more than one silicon die attached, for instance by 'flip-chip', to an IC package. Other problems of these conventional solutions include: the requirement for a separate technological step for placing and connecting IC dies to the package, limitations to only 2D structures for the antenna elements, difficulties in handling dual polarized arrays due to the need for phase controlled connectivity leading to lack of control over mode conversion effects, lack of control over boundary conditions inside the array stack, which leads to a limitation of the overall stack size, and difficulties in controlling inter-element coupling to an application board and/or external equipment.

An additional set of problems is linked to the architectural limitations of the analogue beamformer to provide several antenna beams simultaneously, leading to system-level limitations, particularly in the mobile applications when smooth handover from one communication scenario to another is required.

A further additional set of problems is linked to high power amplification requirements inside the array, and attributed to traditional phase antenna array there are inherent difficulties in providing reliable and cost effective DPD solutions to linearization of the large ensemble of PA modules, associated low power efficiency and spectral purity problems, as well as out of band radiation issues due to PA non-linearity.

Together, these losses and limitations are limiting for beamforming antenna applications because they degrade the electromagnetic performance of the antenna. These degradations can only be compensated by increasing the number of elements in the array, or by increasing the gain of each antenna element, but neither approach is desirable since they add excess cost, size, weight and power to the antenna.

Polarization Control in Phased Antenna Arrays

For mobile communication there is a system-level requirement for polarisation adaptation in some form. This in turn leads to the need for dual polarized array, an architectural solution for an antenna array operating at two orthogonal polarizations simultaneously. Orthogonal polarizations here is meant to be defined in general terms of waves having two orthogonal polarization states, for example Linear Horizontal/Linear Vertical, circular RH/circular LH, up to the general case of elliptical polarizations of two opposite signs and orthogonal slant angles. The complication when dual polarized operation is required is that it doubles the number of combiners and the need for phase-controlled connectivity between all components.

It can also be difficult to achieve substantial high levels of RF power in an antenna array.

These problems often lead to splitting receive and transmit parts of the system to separate receive and transmit apertures—i.e. virtually substituting a single receive-transmit array with separate receive and separate transmit arrays. The resulting two separate apertures require double the footprint, and substantially increases the cost of a device. Signal processing also requires for correction for the phase centre positions of the two separate apertures, again adding further to cost and complexity.

All of this leads to cost, particularly in the beam former, due to the phase shifter cost, corporate combiner cost and other factors.

SUMMARY OF THE INVENTION

In view of the above-mentioned problems the present invention aims to improve the conventional phased antenna array devices, and their production methods. The present invention has thereby the following objectives.

To provide an inherently dual polarized architecture aimed at extending to substantially large number of antenna elements without the need for duplication of connectivity and phased controlled connectivity in the array.

To reduce the inherent RF losses and limitation to the number of elements because of the analogue beamformer and corporate combiner/divider.

To provide an architectural solution for splitting transmit and receive signals inside the array without splitting the array aperture into separate transmit and receive apertures—i.e. maintaining a common radiating aperture for receive and transmit signals while performing substantially different signal processing in each case.

To provide the architectural solution suitable for generating more than one antenna beam at the same time;

To remove above-mentioned size limitations of, for instance, standard IC packages.

To provide the manufacturing and production methods to reduce manufacturing complexity and production cost of such devices. The present invention also aims at the possibility of using substantially more than one silicon die integrated into phased antenna array device.

The invention also seeks to address the issue of DPD complexity through the application of one or a small number of efficient bulk-feed power amplifiers, rather than a multitude of smaller distributed power amplifiers.

According to the present invention there is provided an antenna device a method of manufacture of such a device as defined in the attached claims.

In particular, one example of the present invention employs IC packaging technologies, which address the problems of conventional phased antenna array devices. Preferably, examples of the present invention apply reconstituted wafer techniques of IC packaging for manufacturing phased antenna array devices. These techniques allow for substantial reduction in manufacturing complexity and production cost.

BRIEF DESCRIPTION OF THE DRAWINGS

The present invention will now be described in relation to the accompanying drawings, in which.

FIRST EMBODIMENT OF THE INVENTION

Figure 1:
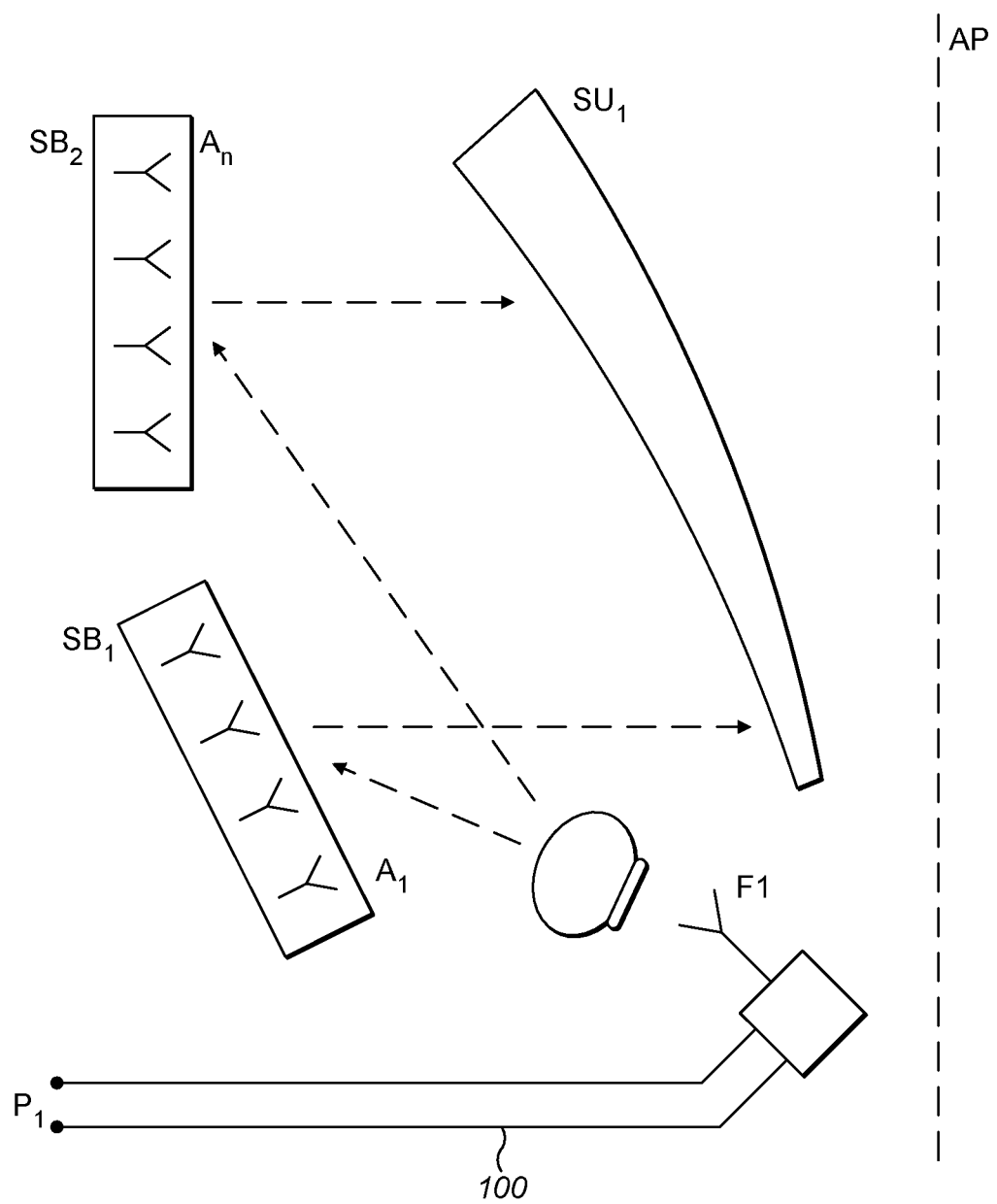
FIG. 1 shows a phased antenna array device according to an example of the present invention.

FIG. 1 shows a phased antenna array device 100 according to an embodiment of the present invention. Here a first aspect of the present invention provides a phased antenna array device, comprising a first input port for interfacing receive and/or transmit signals to the antenna array. The port P1 may be coaxial, waveguide, or other type of connection with one or several connectors comprising the port. It leads to a section of the feeding line L1 of non-zero length, connecting the port to the feed element F1. To ensure dual polarised operation of the phased antenna array device, the cross section of the line has to have rotational symmetry of the minimal order C4 and maintain two orthogonal azimuthally non-uniform dominant propagating modes. For example, in the case of circular waveguide there will be an order of symmetry $C^\infty$, with two orthogonal dominant modes TE11 propagating to/from the port and connecting with the antenna feed element F1. The need for a transmission line is due to the mutual spatial positioning requirements applied to the substrate(s) and the feed element F1 that require this connectivity. Advantageously, the line can be also used to accommodate the optional power amplifier (s), one per propagating mode, and an out-of-band transmit filtering after the PA.

Preferably, port P1 is connected to an optional orthomode transducer (OMT), in which case the port P1 interface is superseded by a pair of connectors, one per polarization. The OMT's implementation is preferably planar, which is compatible with technological processes use in manufacturing of the substrate SBn. The dielectric layers used to form the OMT are part of the metal/layer stack used to manufacture the substrate(s). Alternatively, the OMT's may be formed as part of the antenna elements, for example in case when antenna elements are chosen to be realized as orthogonal pairs of dipoles or similar structures. Dielectric filling can be used advantageously for reduction of inter-element spacing.

In a transmit mode of operation the RF energy is fed via the line L1, and radiated by the feed element. The feed element may have number of possible realizations, for example as a square or circular horn, printed patch antenna, crossed Yagi pair, or splash-plate antenna. The feed element F1 is illuminating at least one substrate SB1 positioned within the angular boundaries of the feed element's radiation pattern, with the edge of the substrate receiving the specified fraction of the total RF energy radiated by the F1, for example −10 dB. The energy radiated by the feed element F1 is received and processed by the substrate(s) by means of an internal structure that will be described below, and re-radiates in the direction of the aperture plane AP, as shown in FIG. 1.

An optional superstrate structure can be used to adjust the phase distribution of the transmit signal at the aperture plane AP. In the example in FIG. 1 there are shown two substrates located at different spatial positions, receiving the energy from the feed and re-radiating it towards the aperture plane. In receive mode of operation the energy received by the aperture plane AP passes through the optional superstrate and illuminates the substrates SB1 and SB2, gets processed by the internal structure formed in each substrate, and is re-radiated towards the feed element F1 for subsequent channelization into transmission line L1.

Figure 2:
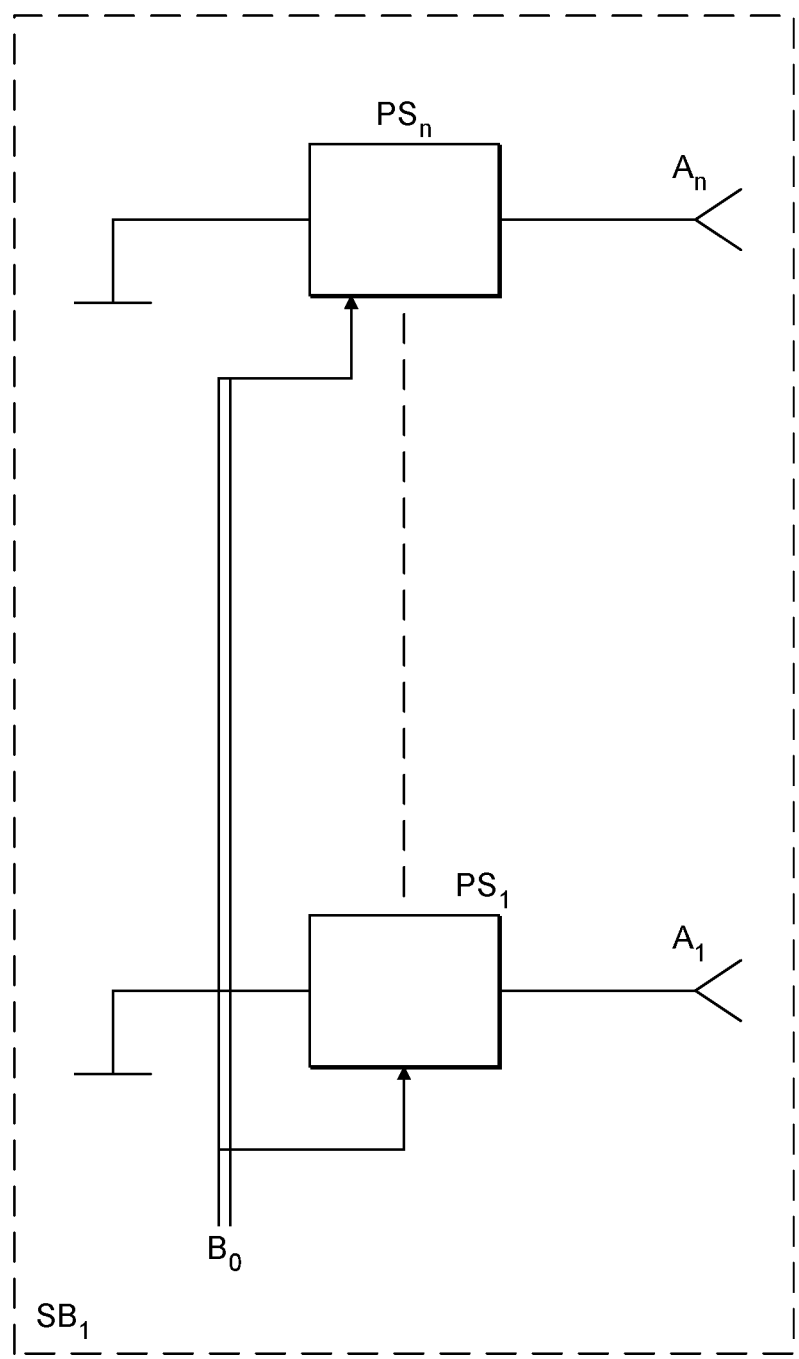
FIG. 2 shows a substrate-level implementation of phased antenna array.

Referring to FIG. 2, the Phase Antenna Array may contain at least one or more substrates SB1 . . . SBn with each substrate (substrate number j) having specific layered structure comprised of the following (see FIG. 2):

A layer of antenna elements $A_{j1}$ . . . $A_{jn}$;
An optional layer of OMTs;
A layer of phase shifter $PS_{j1}$ . . . $PS_{jn}$;
Connectivity layers to ensure the necessary connectivity between elements and/or between layers; and
An RF short layer $SH_{j1}$ . . . $SH_{jn}$.

The layer of antenna elements and the layer of OMTs should maintain the minimal order of symmetry $C_4$ to facilitate dual-polarized operation of the substrate and the entire antenna array. This requirement is not mandatory for the rest of the layers if positioned behind the layer of OMTs, where two polarisation components split and separate into orthogonal components. Subsequent processing can be done using layers of lower order of symmetry, for example using microstrip lines, in which case the total of number of phase shifters doubles: $SH_{j1}$ . . . $SH_{jt}$, where t=2*n. Phase shifters apply variable phase shift to the passing signals and controlled by a set of control lines forming control bus $B_n$ of this substrate. Phase shifters can be realized in a number of ways, including electromechanical, MEMS, ferroelectric, pin-diode, varactor, integrated CMOS, GaAs et ctr. Control signals can be digital or analog depending on the realization of the phase shifters, subject to providing sufficient least significant bit (LSB) resolution.

RF short layer $SH_{j1}$ . . . $SH_{jn}$ is provided to apply an electric short boundary condition to the signals after the phase shifters $PS_{j1}$ . . . $PS_{jn}$.

In this implementation receive and transmit signals are sharing the same interface, port P1, consequently this example may require an additional circulator or antenna switch connected to $P_1$ via an optional OMT for receive/transmit separation, with one set being provided per polarization component.

Referring to FIGS. 4 to 12, these aspects of the present invention provide a substrate-level array devices comprising a first dielectric layer, at least one die embedded into the first layer.

There are two apsects to structuring at the substrate-level.

First Aspect Substrate-Level Array

Figure 4:
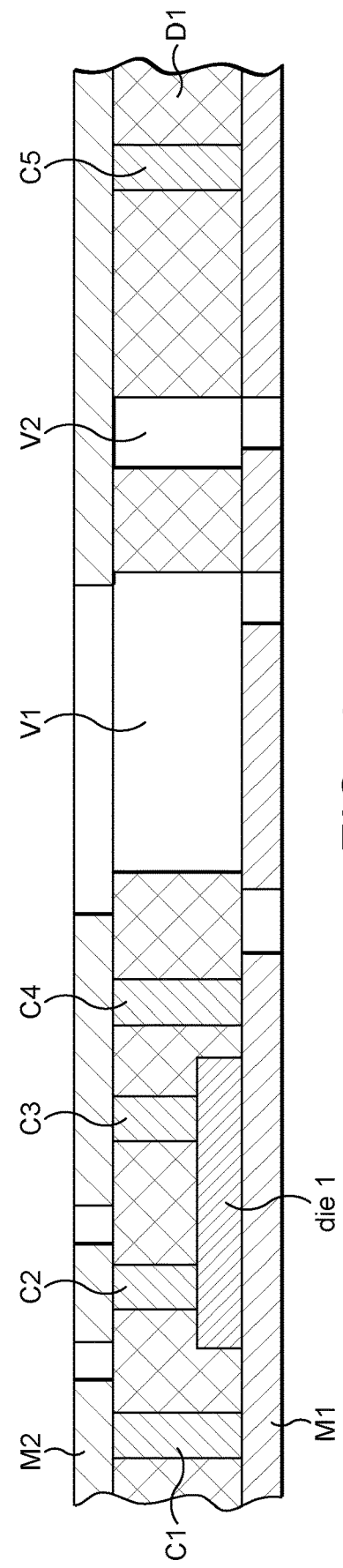
FIGS. 4 to 12 show schematic views of layered structures in substrates employed in the invention.
Figure 5:
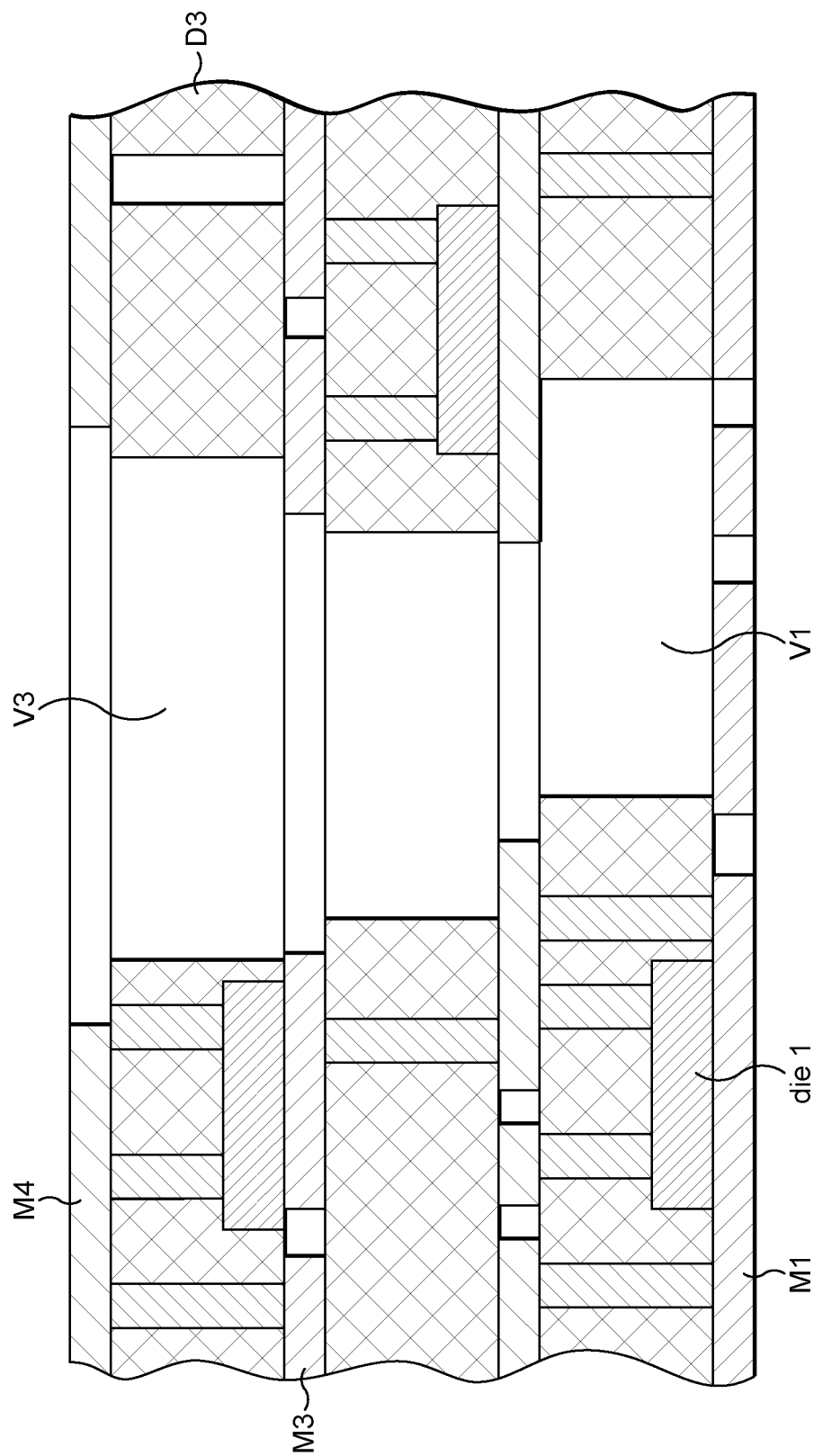
Figure 6:
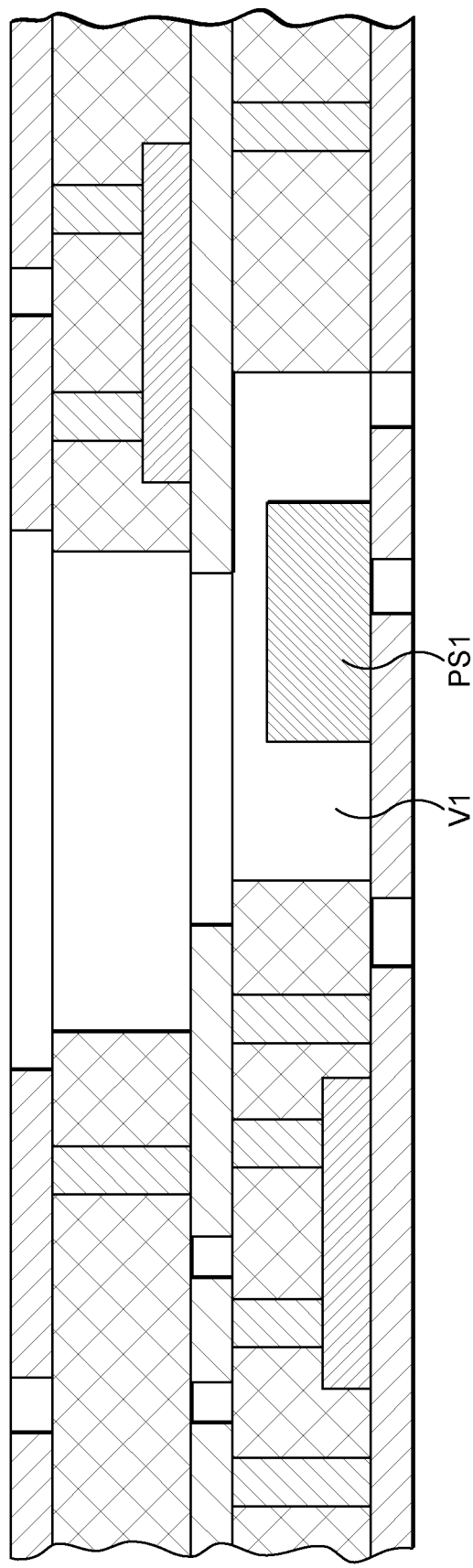

A first aspect provides a substrate-level array comprising a first metal layer M1 (as shown in FIG. 4), a first dielectric layer D1, at least one die embedded into the first dielectric layer, a second metal layer M2 formed on top of the first dielectric layer, with plurality of conductive channels (vias) C1, C2, . . . and plurality of voids V1, V2, going through the first dielectric layer. A first interconnection structure is formed in a first metal layer, a second interconnection structure formed in a second metal layer M2, and a plurality of antenna elements formed in a second metal layer using the interconnection structure. Voids can be filled by air or by another dielectric. The first and the second interconnection structures provide galvanic connectivity between input/output pads of the silicon die and antenna elements, as well as between pads of the silicon die and the first metal layer, and as well as between antenna elements and the first and the second metal layers.

The phased antenna array substrate according to the first aspect does not require any standard IC packaging, but can, for instance, be provided on a full reticle wafer. The device of the first aspect is not therefore limited by the above-mentioned size limitations of standard IC packaging.

The substrate-level array is therefore considered as integrated device i.e. it is produced in one manufacturing process. As opposed to conventional devices in which die is flip-chip bonded to an IC package that provides the antenna elements. For such a conventional device more than one manufacturing process is required. Accordingly, the device of the invention can be manufactured with less complexity and at lower cost.

Further, with the phased antenna array substrate of the first aspect, multiple dies, for instance multiple silicon dies or multiple IC chips (die1 in FIG. 4), can be integrated into the first dielectric layer D1. Thereby no flip-chip bonding is required. The integration of the at least one die into the dielectric layer further helps to reduce thermal stress on the dies during manufacturing, and accordingly improves device reliability and reduces cost per device.

In a first implementation form of the substrate according to the first aspect, the phased antenna array substrate further comprises a second dielectric layer D2 provided on top of the second metal layer M2, at least one die embedded into the second dielectric layer, a third metal layer M3 formed on top of the second dielectric layer, with plurality of conductive channels and plurality of voids going through the second dielectric layer, and the interconnection structure formed in a third metal layer, as well as a plurality of antenna elements formed in a third metal layer. The interconnection structure provides galvanic connectivity between input/output pads of the silicon die and antenna elements, as well as between pads of the silicon die and the second metal layer, and as well as between antenna elements and the second and the third metal layers (see FIG. 5).

In a second implementation form of the substrate according to the first aspect, the phased antenna array substrate further comprises at least one phase shifter (PS1 in FIG. 6) embedded inside the void formed in the first dielectric layer with an RF short layer formed by the first metal layer presenting an electric short boundary condition to the phase shifter.

Figure 7:
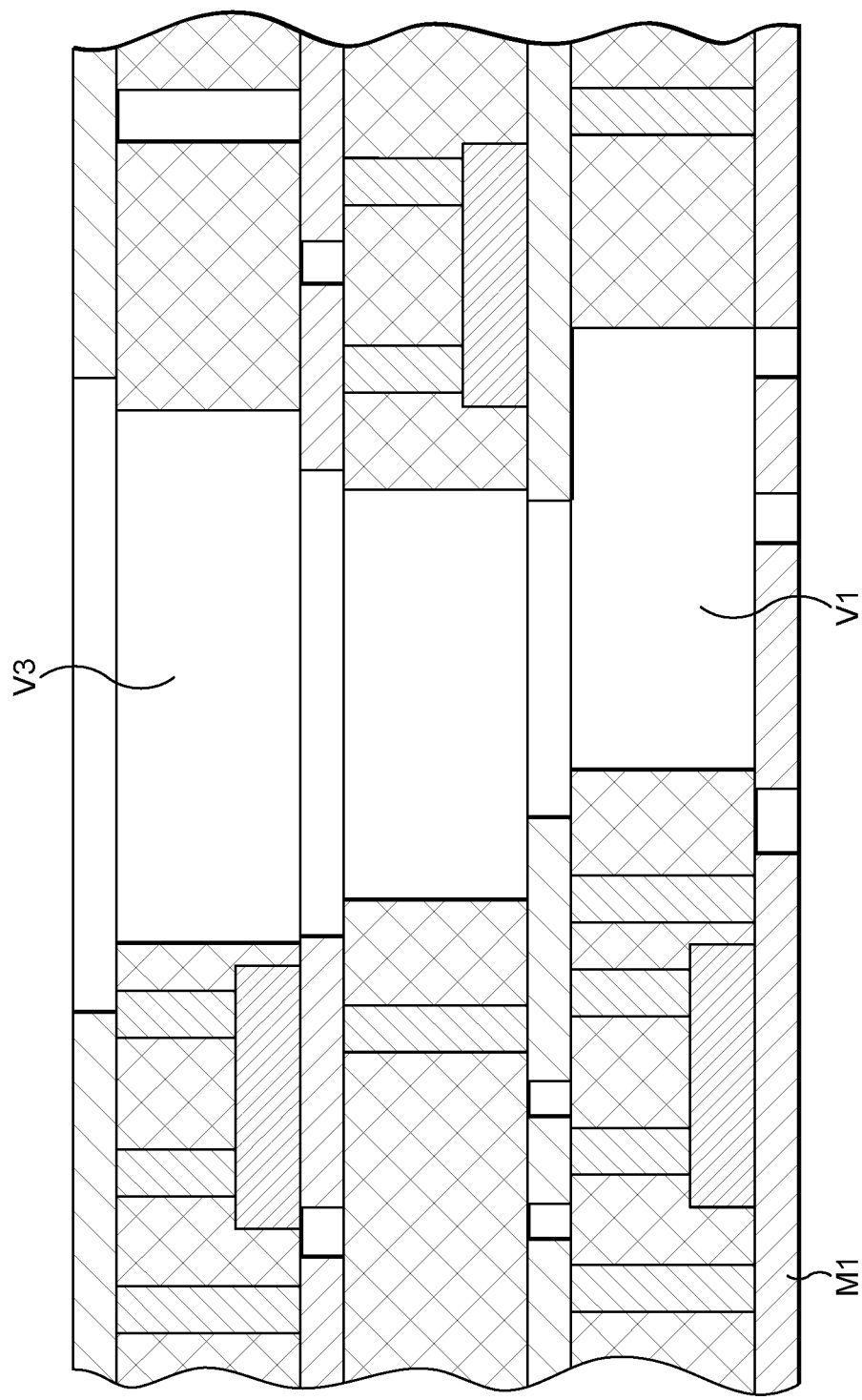

In a third implementation form of the substrate according to the first aspect, the phased antenna array substrate further comprises a third dielectric layer D3 provided on top of the third metal layer M3 (as shown in FIG. 7), with a plurality of conductive channels and plurality of voids going through the third dielectric layer. A fourth metal layer M4 is provided on the third dielectric layer, a fourth interconnection structure formed in the fourth metal layer, a plurality of antenna elements formed in a fourth metal layer on the surface of a third dielectric layer, and the second antenna elements are connected via the second interconnection structure to the at least one die.

Figure 8:
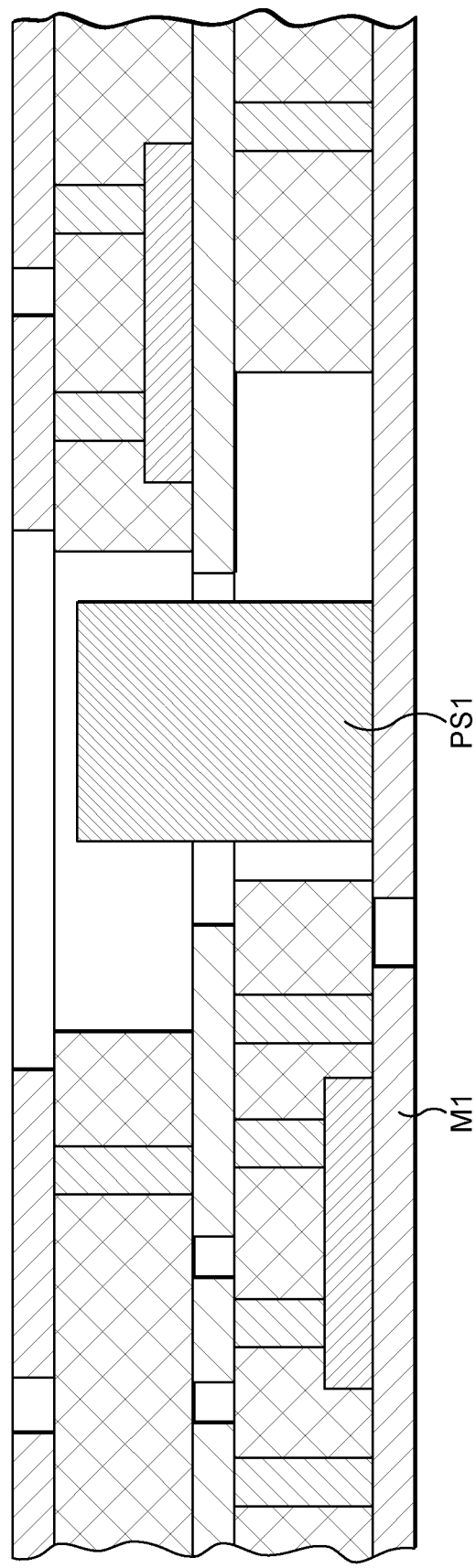
Figure 9:
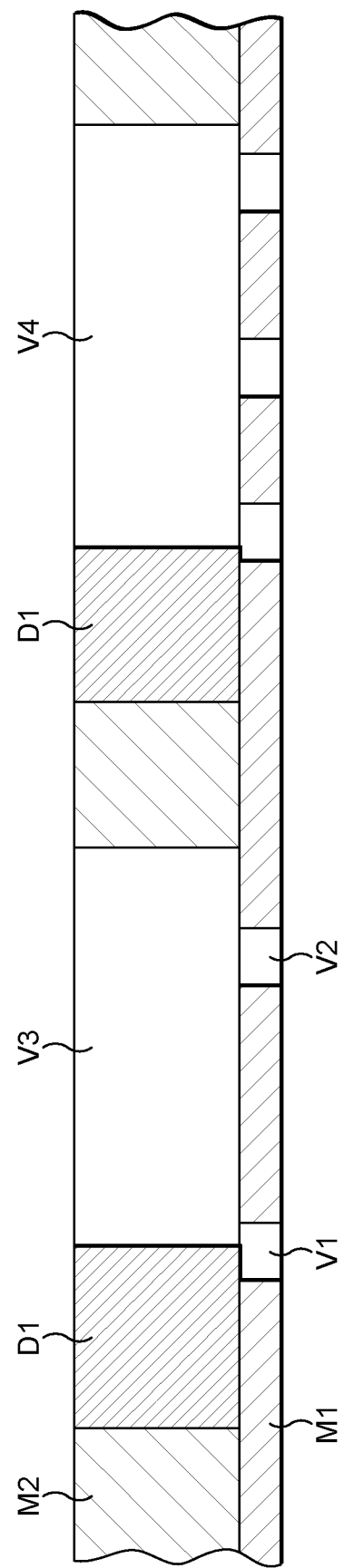

In a fourth implementation form of the substrate according to the first aspect, the phased antenna array substrate further comprises at least one phase shifter PS1 located inside the voids formed in the first and in the second dielectric layer with an RF short layer formed by the first metal layer presenting an electric short boundary condition to the phase shifter (see FIG. 8).

The use of a layered structure for the wafer-level implementation of the substrate allows for efficient usage of both sides of the device, which may be the two sides of the substrate. That is, antenna elements can be placed both on the front side and the back side of the substrate. This allows for creation of 3D antenna arrays, which may be used to realize specific RF functions requiring such a 3D antenna configuration. Examples of RF functions requiring 3D rather than 2D configuration of the antenna array are: low elevation beamforming, wide angle scanning, monopulse beamforming, mode suppression, mode generation, and phase compensation. Additionally, less RF loss is expected in comparison with planar 2D structures, which are typically based on strip-lines or co-planar waveguides.

In a fifth implementation form of the substrate according to the first implementation form of the first aspect, the phased antenna array wafer further comprises at least one interposer embedded into the first dielectric layer, the interposer being configured to connect the at least one die to the second interconnection structure. Interposers can advantageously be used as building blocks of non-planar, i.e. 3D structures. Thereby, the limitations of conventional structures and devices using only 2D antenna arrays are eliminated. The at least one interposer is preferably based or implemented based on functional materials to realize the specific RF functions mentioned above. It is also possible to stack silicon dies with specialized interposers used for thermal management.

Interposers can also be combined with embedded wafer level package metal stacks for realizing, for instance, frequency selective structures, band gap structures, metamaterials, ferroelectric materials, i.e. smart materials engineered to have specific properties, and made preferably from assemblies of multiple elements fashioned from composite materials.

In a sixth implementation form of the wafer according to the first implementation form of the first aspect, the phased antenna array substrate further comprises a metamaterial structure formed in the third metal layer, the metamaterial structure being designed to control boundary conditions at the surface of the dielectric layer presented to antenna elements.

Metamaterials are smart materials engineered to have specific tailored properties. With the design of the metamaterial structure, the boundary conditions presented to the antenna elements can advantageously be changed and controlled. Also, inter-element coupling, for instance, between different antenna elements, can be controlled with such a structure. Thereby, the device of the present invention can realize better RF specifications including scanning angle, energy efficiency and RF losses when compared to prior art devices.

In a seventh implementation form of the substrate according to the sixth implementation form of the first aspect, at least one component is a functional material—preferably a ferroelectric, ceramic, ferrite or nanomaterial, configured to correct a phase of the phase-shifted signals, and/or to prevent a mode conversion of the phase-shifted signals.

Functional materials are designed to make use of their natural or engineered functionalities to respond to the changes in electrical or magnetic fields, physical and chemical environments, etc. Examples of the RF/electronic functional materials are ferroelectrics, piezo-ceramic, ferrites, composite absorbers, magnetodielectric and nano-ceramic materials. With such functional materials embedded into the device of the present invention, for instance, improved electrical and/or thermo-mechanical properties of the device can be achieved. In combination with active dies, wafer-integrated high-quality devices become possible.

Second Aspect Substrate-Level Array

A second aspect substrate structure provides a wafer-level array comprised of a substrate containing a first metal or dielectric layer M1 (see FIG. 9) that may contain plurality of through voids (holes, perforations) V1, V2, . . . , a second metal or dielectric layer M2, formed on top of the first metal layer, with plurality of through voids going through the layer. Voids should be fully or at least partially configured to maintain the minimal order of symmetry C4. Voids may be fully or partially filled by air and a first dielectric material D1. The first and the second layers may optionally be merged in a single 3D structure.

Figure 10:
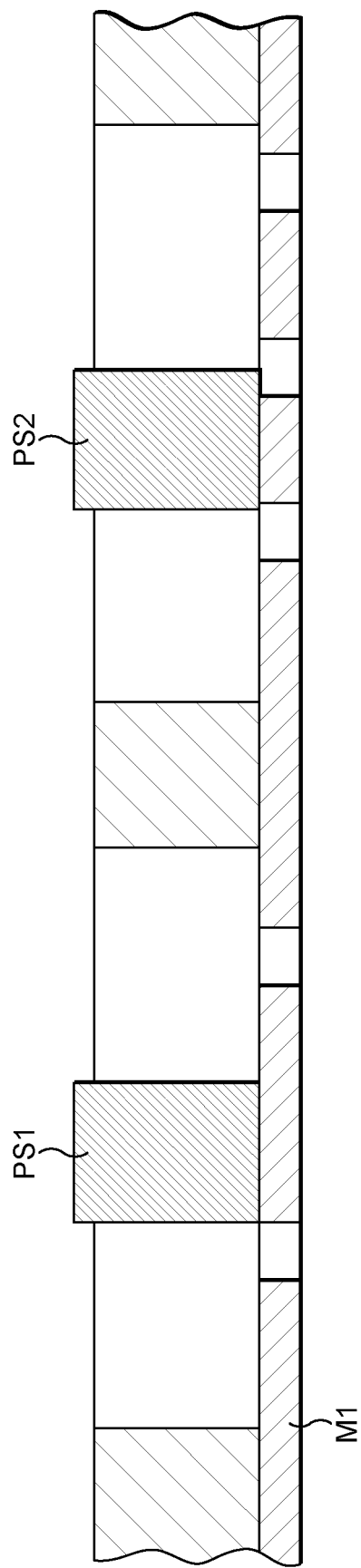

In a first implementation form of the substrate according to the second aspect, the phased antenna array substrate further comprises one or more phase shifters PS1, PS2, located inside the voids, as per second aspect, and filling the voids fully or partially (see FIG. 10).

Figure 11:
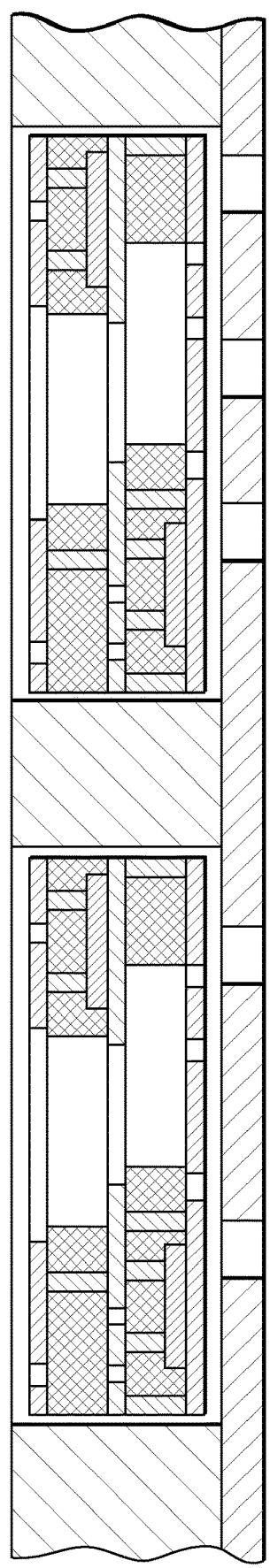

In a second implementation form of the substrate according to the second aspect, the phased antenna array substrate further comprises a one or more substrates according to one of the implementation forms of the first aspect, located inside the voids, as per second aspect, and filling the voids fully or partially (see FIG. 11).

Figure 12:
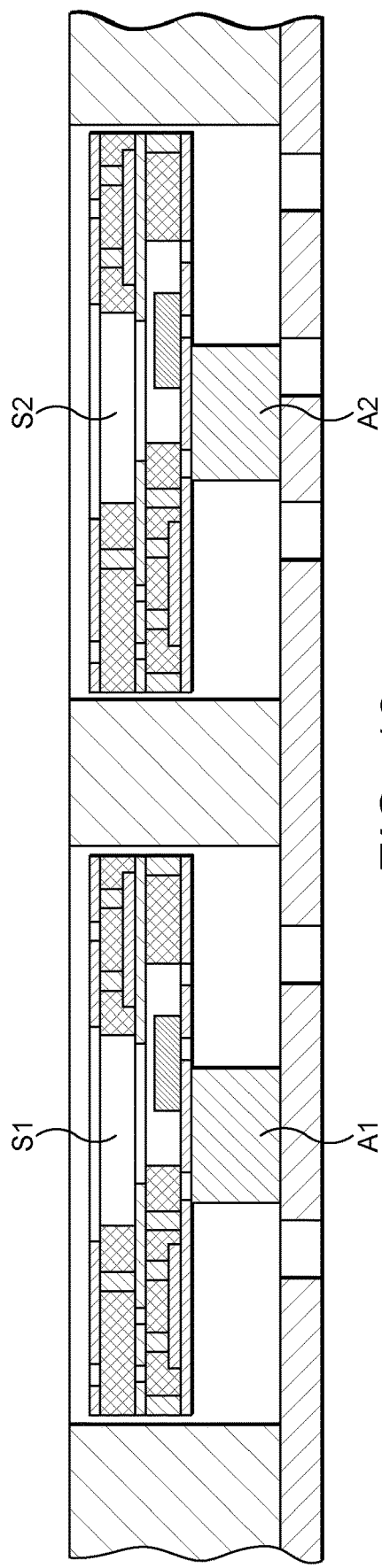

In a third implementation form of the substrate according to the second implementation form of the second aspect, a substrate contains one or more actuator A1, A2, located inside the void, between the first metal layer and antenna array substrate S1, S2 as per first aspect, and facilitating controlled movement of the said substrate inside the void (see FIG. 12).

An actuator is a device providing controlled, gradual or discrete, change of the spatial position and orientation of an object within specified accuracy. Actuators can be mechanical, electro-mechanical, micro electro-mechanical (MEMS), piezo, electromagnetic, shape memory alloy, shape memory polymer, pneumatic, hydraulic or other devices that facilitate controlled and sometimes limited movements or positioning which are operated electrically, mechanically, or by various gases such as air, or through a hydraulic mechanism.

In a fourth implementation form of the substrate according to the second implementation form of the second aspect, contains one or more actuator, located inside the void, between the first metal layer and antenna array substrate as per first aspect, and facilitates controlled movement of the substrate inside the void.

SECOND EMBODIMENT OF THE INVENTION

Figure 3:
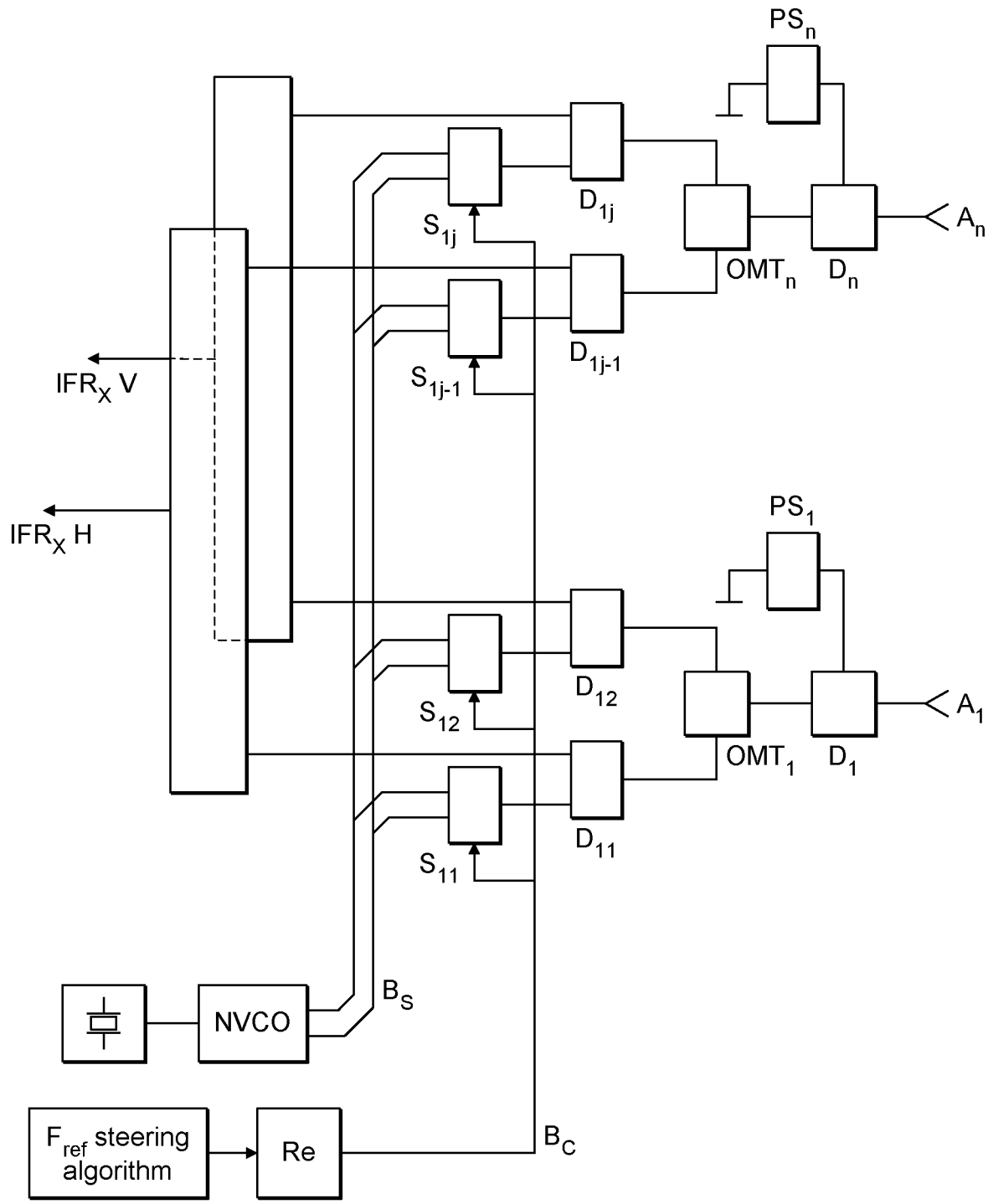
FIG. 3 shows a phased antenna array device according to a further example of the present invention.

A second example of the invention is shown in FIG. 3 and provides an architecture where receive and transmit signals are separated inside the array, processed and interfaced via separate receive and transmit ports. This example can be advantageously used when receive and transmit signals are widely separated in frequency, but have to be co-located in space and share the same antenna aperture AP. Also, it is an implementation of the concept of having several receiving beams formed simultaneously, each channelled into one of a number of receive ports. The Phase Antenna Array may contain at least one or possibly multiple substrates SB1 SBn with each substrate (substrate number j) having a specific layered structure comprised of the following:

A layer of antenna elements $A_{j1}$ . . . $A_{jn}$;
A diplexing layer;
A layer of OMTs;
An RF front-end layer $D_{j1}$ . . . $D_{jn}$;
A synchronization layer;
Connectivity layers to ensure the necessary connectivity between elements and/or between layers; and
An IF combining layer IF-Rx-V and IF-Rx-H For the layer of antenna elements, diplexing layer and the layer of OMTs, each of them should maintain the minimal order of symmetry C4 to ensure dual polarized operation of the substrate and the entire antenna array. This requirement is not applicable for the rest of the layers. Subsequent processing can be done using layers of lower order of symmetry, for example microstrip lines as described in relation to the example of FIG. 1.

Phase shifters apply variable phase shift to the passing signals and are controlled by a set of control lines forming control bus Bn of the substrate. Control signals can be digital or analog depending on the realization of the phase shifters.

In the layer of OMTs two polarisation components split and separate into orthogonal components and channelled to the RF front-end layer Dj1 . . . Djn for amplification using integrated LNAs and down-conversion with optional filtering if required. The function of the synchronization layer is to distribute, connect and multiplex LO reference signals. The low frequency LO reference is generated by a numerically controlled oscillator (NCO) as a set of signals having plural phase states defined by the required LSB granularity. These signals form a synchronization bus Bs comprising a synchronization layer. An NCO is forming a set of these signals with multiple relative phases (time delays) that are optionally filtered and channelled via synchronization bus Bs, distributed across the substrate to RF front-ends, and subsequently multiplexed using switches Suk, to synchronize each local PLL. Multiplexing is controlled by a beam steering algorithm with additional randomization applied to the synchronization signal's switching/multiplexing timing via switches Skj. This suppresses spurious frequency components generated by PLL due to periodic phase manipulation/switching of the reference signals fed into the local PLLs. Randomization is applied to the switching time via a randomizer Rc. The down converted products at IF are phase-shifted according to the relative phase of the corresponding reference, and subsequently combined at IF using dedicated analogue voltage combiners IF-Rx-V and IF-Rx-H, thus forming a pair of orthogonal components of the receive IF signal for receive beam.

Down conversion is preferably performed by an integrated IC chip performing RF processing inside the receive frequency band. That is amplification, LO generation and down conversion, for each of the two orthogonal polarization components after the OMT. The output low IF voltage of each IC is optionally filtered and subsequently connected to a voltage combiner. As a result, the combining beamforming function is performed by simple analogue voltage combiner rather than lossy and expensive corporate RF combiner as in the prior art. This IF beamformer can be replicated once more and connected to the existing one at a point after the LNA so as to form an independent Rx beam. The cost of having an additional receive beam will be therefore determined by the cost of an additional set of RF ICs and switches.

The invention claimed is:

1. A phased antenna array device comprising:
   at least one input port $P_1$ for interfacing receive and transmit RF signals to/from an antenna array;
   at least one feeding line designed to carry RF signals of two orthogonal polarizations from the at least one input port $P_1$;
   at least one antenna feed element with an aperture or cross section having an order of symmetry C4 and supporting RF signals of two orthogonal polarizations;
   at least one first substrate from one or more substrates containing a plurality of antenna elements integrated into the at least one first substrate, with each antenna element capable of operating at two orthogonal polarizations;
   diplexer junctions integrated into the at least one first substrate, with each diplexer junction operating at two orthogonal polarizations, wherein at least one of the plurality of antenna elements are connected to the diplexer junctions;
   a plurality of phase shifters connected to corresponding antenna elements, each phase shifter operating at two orthogonal polarizations, an output port of each phase shifter being connected to a short circuit,
   wherein respective ones of the plurality of phase shifters $(PS_1\text{-}PS_{1(?)})$ are connected to corresponding transmission ports of the diplexer junctions;
   a plurality of orthomode transducers (OMTs) connected to corresponding output receive ports of the diplexer junctions $(D_1\text{-}D_n)$ with each OMT performing separation of orthogonally polarized signals inside a receive frequency band; and
   a first plurality of RF IC chips $(D_1\text{-}D_j)$ each containing an LNA, PLL frequency synthesizer and downconverter connected to corresponding receive output ports of each OMT, with each IC chip performing RF processing inside the receive frequency band, including amplification and down-conversion, for each of the two orthogonal polarizations separated by the OMT in use, the output port of each IC chip being connected to a corresponding combiner,
   wherein, in use, a first receive beam is formed using plurality of synchronization signals fed into the one or more substrates via a synchronization bus $B_s$ and connected to the synchronization inputs of the PLL frequency synthesizers via switches $(S_{11}\text{-}S_{1j})$ so as to allow a selection of the relative phase of the LO signal generated by each PLL.

2. The phased antenna array device according to claim 1, further comprising: a numerically controlled oscillator (NCO) providing a plurality of synchronization signals of all required phase states for the phased antenna array device as well as phase and frequency stability locked to a single Xtal-stabilized reference.

3. The phased antenna array device according to claim 1, further comprising:
   a second plurality of RF IC chips with their corresponding inputs connected parallel to the corresponding inputs of the first plurality of RF IC chips and having outputs connected to a second set of combiners, forming a second receive beam, independent from the first receive beam, with a second set of switches providing, in use, independent scanning/beamforming for the second receive beam.

4. The phased antenna array device according to claim 1, further comprising:
   a first superstrate positioned over the one or more substrates and arranged to correct phase distribution of the signals radiated by the one or more substrates towards an aperture plane located in a free space beyond the outline of the feed element at the front of the array.

5. The phased antenna array device according to claim 2, further comprising:
   a first interconnection structure positioned behind the one or more substrates and connecting the synchronization bus $B_s$ between the NCO and plurality of IC chips so as to maintain phase stability of the synchronization signals fed into each of the one or more substrates.

6. The phased antenna array device according to claim 1, further comprising:
   at least one interposer embedded between the antenna elements and the OMTs, the interposer being arranged to perform frequency separation/discrimination between reception and transmission bands.

7. The phased antenna array device according to claim 4, further comprising:
at least one interposer embedded between the synchronization bus and an interconnection structure, the interposer being arranged to connect at least one die to the synchronization bus.

8. The phased antenna array device according to claim 3, further comprising:
a metamaterial structure formed in a superstrate, the metamaterial structure being arranged to control boundary conditions at a surface of the superstrate presented to the one or more substrates.

9. The phased antenna array device according to claim 3, wherein at least one component comprises a functional material, preferably a ceramic, ferrite or nano material.

10. The phased antenna array device according to claim 7, wherein at least one component of the phased antenna array device is arranged to correct a phase of phase-shifted signals, and/or to prevent a mode conversion of the phase-shifted signals.

11. The phased antenna array device according to claim 6, wherein at least one component of the phased antenna array device is arranged to support propagation mode transformations of phase shifted-signals and/or to create left handed propagation properties for the phase shifted-signals.

12. The phased antenna array device according to claim 1, further comprising:
at least one further layer configured to isolate antenna elements from each other at radio frequencies, or to isolate the phased antenna array device from an external application board or electronic equipment attached thereto in use.

13. The phased antenna array device according to claim 1, further comprising:
at least one field effect transistor arranged to amplify signals transmitted at radio frequency within the phased antenna array device.

14. The phased antenna array device according to claim 1, formed by a reconstituted wafer process or an embedded wafer level package process.

15. The phased antenna array device according to claim 1, the phased antenna array device being formed on a full reticle wafer.

* * * * *